(12) United States Patent
Chen et al.

(10) Patent No.: US 10,890,775 B2
(45) Date of Patent: Jan. 12, 2021

(54) HEAD MOUNTED DISPLAY DEVICE

(71) Applicant: Quanta Computer Inc., Taoyuan (TW)

(72) Inventors: Chun-Lung Chen, Taoyuan (TW);
Yuan-Peng Yu, Taoyuan (TW);
Hung-Chieh Wu, Taoyuan (TW);
Chang-En Tsai, Taoyuan (TW);
Yu-Chun Tsai, Taoyuan (TW)

(73) Assignee: Quanta Computer Inc., Taoyuan (TW)

( * ) Notice: Subject to any disclaimer, the term of this patent is extended or adjusted under 35 U.S.C. 154(b) by 0 days.

(21) Appl. No.: 16/580,839

(22) Filed: Sep. 24, 2019

(65) Prior Publication Data
US 2020/0348524 A1 Nov. 5, 2020

(30) Foreign Application Priority Data
May 3, 2019 (TW) .............................. 108205520 U

(51) Int. Cl.
*G02B 27/01* (2006.01)
*G02C 11/00* (2006.01)

(52) U.S. Cl.
CPC ..... *G02B 27/0176* (2013.01); *G02B 27/0172* (2013.01); *G02C 11/10* (2013.01); *G02B 2027/015* (2013.01); *G02B 2027/0138* (2013.01); *G02B 2027/0178* (2013.01)

(58) Field of Classification Search
CPC .............................................. G02B 2027/0178
See application file for complete search history.

(56) References Cited

U.S. PATENT DOCUMENTS

2015/0002374 A1\* 1/2015 Erinjippurath .......... G06T 15/08
345/8

\* cited by examiner

*Primary Examiner* — Gustavo Polo

(57) ABSTRACT

A head mounted display device includes a spectacles frame, two temples, an optomechanical module, a lens and a circuit board module. The temples are connected to the opposite ends of the spectacles frame, respectively. The lens is fixed to the spectacles frame. The optomechanical module is loaded on the spectacles frame, jointed to the lens, and configured for outputting signals to the lens. The circuit board module is disposed on the frame and electrically connected to the optomechanical module.

18 Claims, 3 Drawing Sheets

HEAD MOUNTED DISPLAY DEVICE

CROSS-REFERENCE TO RELATED APPLICATION

This application claims priority to Taiwan Application Serial Number 108205520, filed May 3, 2019, which is herein incorporated by reference in its entirety.

BACKGROUND

Technical Field

The present disclosure relates to a wearable device, and more particularly to a head mounted display device.

Description of Related Art

With the advancement of technology, the application of wearable devices worn on the human body has gradually emerged. For example, a head mounted display device can be worn on a user's head to provide corresponding services and operations, such as information, multimedia, recording, photography, and/or lighting services, in time.

However, at present, the design of the spatial configuration of the head-mounted display device is mostly to equip the computation board and peripheral circuits configured to support the display in the single-side frame of the head-mounted display device and then put a counterweight in the other-side temple, so as to satisfy the human body with the feeling of loading balance. As a result, the breakthrough in the improvement of downsizing is unachieved for the head-mounted display device at present.

SUMMARY

One embodiment of the present disclosure is to provide a head mounted display device. The head mounted display device includes a spectacles frame, two temples, at least one optomechanical module, at least one lens, and a circuit board module. The temples are connected to the opposite ends of the spectacles frame, respectively. The lens is fixed to the spectacles frame. The optomechanical module is loaded on the spectacles frame, jointed with the lens, and configured for outputting a signal to the lens. The circuit board module is disposed on the spectacles frame and electrically connected to the optomechanical module.

According to one or more embodiments of the present disclosure, in the aforementioned head mounted display device, the spectacles frame includes an elongated frame, two connection portions, two receiving grooves, and a nose-placing portion. The elongated frame has opposite first and second sides, and the circuit board module is fixed to the second side of the elongated frame. The two connection portions respectively located at the opposite ends of the elongated frame, and respectively pivotally connected to the temples. The receiving grooves respectively disposed between the first side and the second side of the elongated frame, and configured for respectively placing two lenses fixedly. The nose-placing portion is located on the elongated frame and interposed between the receiving grooves, and configured for aligning a nose bridge of a user.

According to one or more embodiments of the present disclosure, in the aforementioned head mounted display device, the elongated frame includes a plurality of separation bars. The separation bars are protruded from the second side of the elongated frame. The nose-placing portion is located between the separation bars. The circuit board module is locked to the separation bars via a plurality of bolts, respectively, and keeps a gap from the enlongated frame.

According to one or more embodiments of the present disclosure, in the aforementioned head mounted display device, the circuit board module includes a main board, a processing unit, and a memory unit. The main board is fixed to the second side of the elongated frame and crosses the nose-placing portion. The processing unit is located on the main board and electrically connected to the optomechanical module. The memory unit is located on the main board and electrically connected to the processing unit.

According to one or more embodiments of the present disclosure, the aforementioned head mounted display device further includes a photographying device. The photographying device is disposed on the spectacles frame. The nose-placing portion is provided with a recess, the recess is located on the second side of the elongated frame, and the photographying device is placed in the recess and electrically connected to the circuit board module.

According to one or more embodiments of the present disclosure, in the aforementioned head mounted display device, the circuit board module further includes a flexible circuit board. The flexible circuit board is flexingly located on the elongated frame, and electrically connected to the circuit board module and the optomechanical module.

According to one or more embodiments of the present disclosure, the aforementioned head mounted display device further includes a battery unit. The battery unit is located on the spectacles frame or one of the temples, and electrically connected to the circuit board module and the optomechanical module.

According to one or more embodiments of the present disclosure, in the aforementioned head mounted display device, the circuit board module is located on the top or bottom of the spectacles frame.

According to one or more embodiments of the present disclosure, in the aforementioned head mounted display device, the circuit board module is located inside or outside the spectacles frame.

According to one or more embodiments of the present disclosure, in the aforementioned head mounted display device, the circuit board module is a system in package (SIP) module.

As a result, in accordance with the architecture described in the above embodiments, the circuit board module of the head mounted display device can be fully integrated into the spectacles frame without being placed in the temple, so that the head mounted display device can achieve a breakthrough in the purpose of downsizing.

It is to be understood that both the foregoing general description and the following detailed description are by examples, and are intended to provide further explanation of the disclosure as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

For the embodiment below is described in detail with the accompanying drawings, embodiments are not provided to limit the scope of the present disclosure. Moreover, the operation of the described structure is not for limiting the order of implementation. Any device with equivalent functions that is produced from a structure formed by a recombination of elements is all covered by the scope of the present disclosure. Drawings are for the purpose of illustration only, and not plotted in accordance with the original size.

Figure 1:
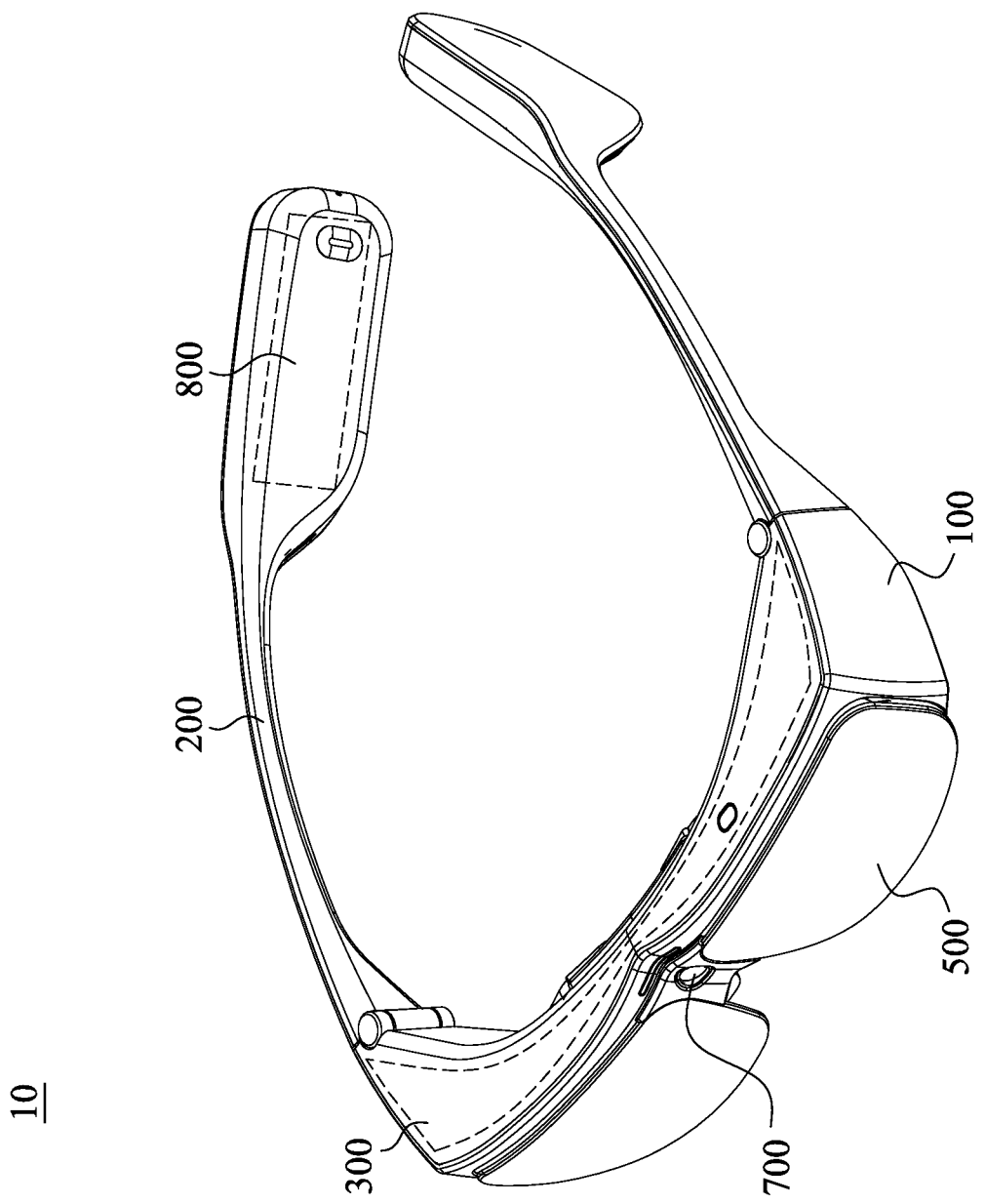
FIG. 1 is a stereogram of a head mounted display device according to an embodiment of the present disclosure.
Figure 2:
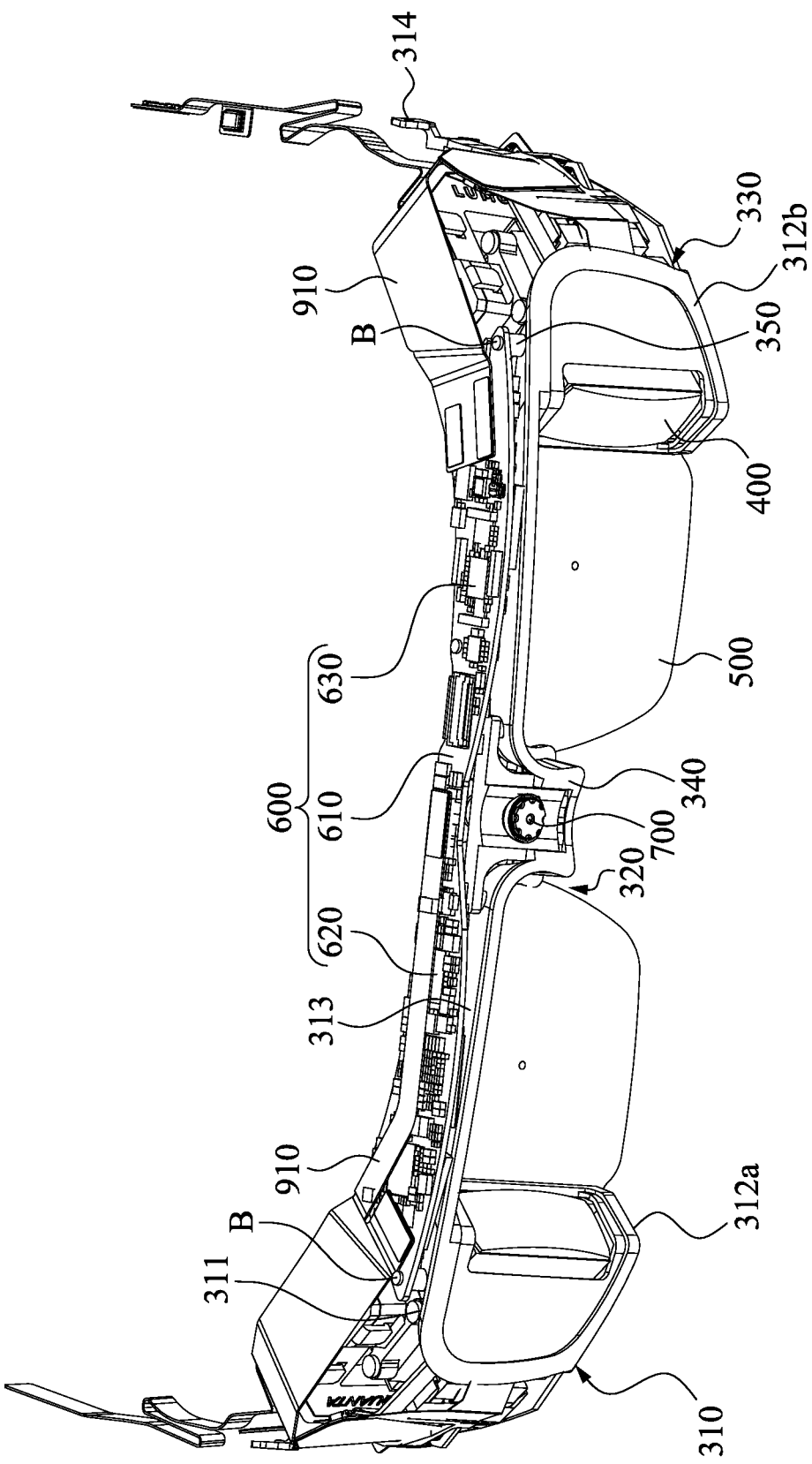
FIG. 2 is a stereogram of a window assembly of FIG. 1.
Figure 3:
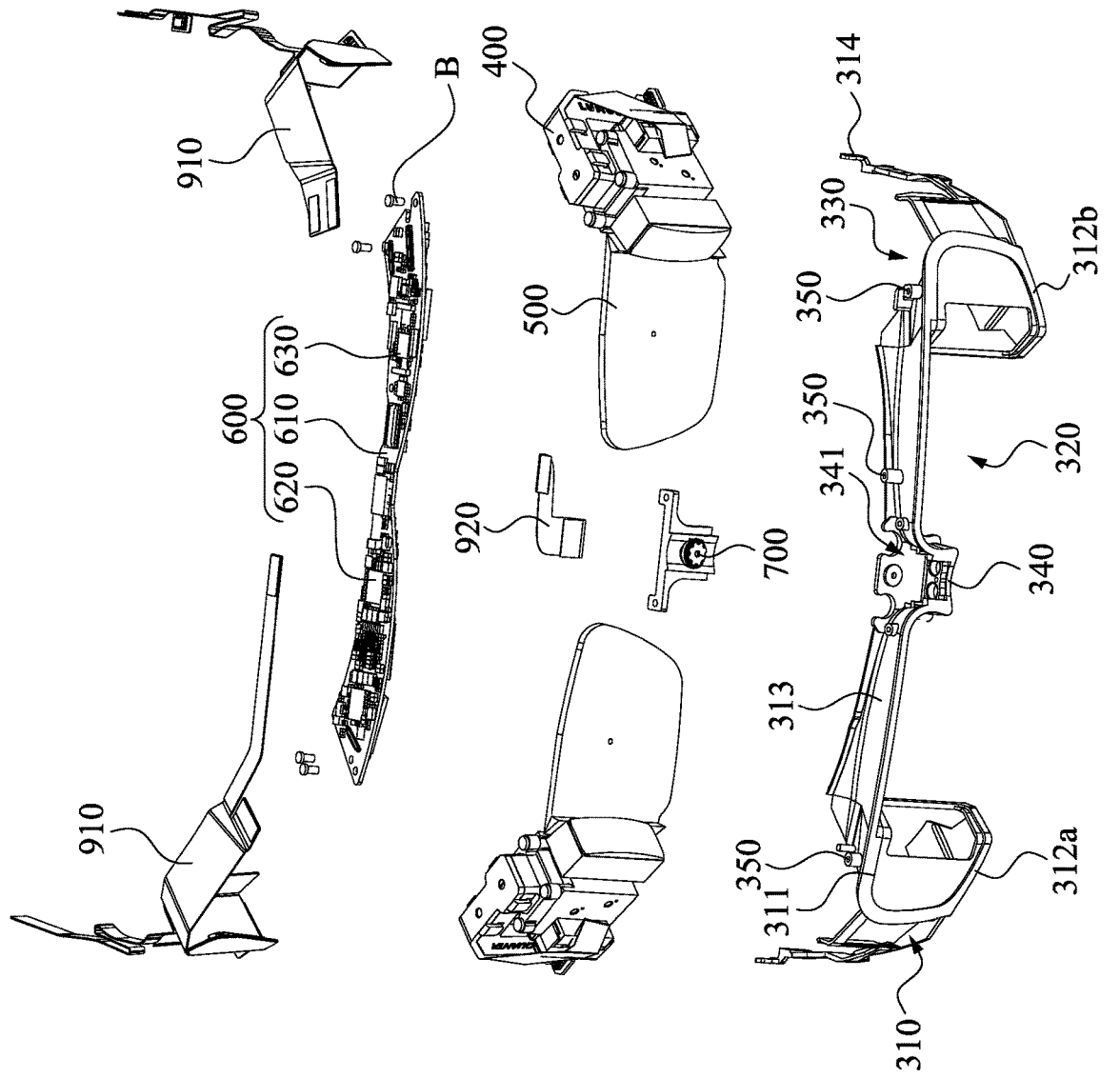
FIG. 3 is an exploded view of the window assembly of FIG. 2.

FIG. 1 is a stereogram of a head mounted display device 10 according to an embodiment of the present disclosure. FIG. 2 is a stereogram of a window assembly 300 of FIG. 1. FIG. 3 is an exploded view of the window assembly 300 of FIG. 2. As shown in FIG. 1 and FIG. 2, the head mounted display device 10 includes a case module 100, a window assembly 300 and two temples 200. The window assembly 300 is enclosed within the case module 100. The two temples 200 are connected to the opposite sides of the window assembly 300 and are located on the opposite sides of the case module 100.

As shown in FIG. 2 and FIG. 3, the window assembly 300 includes a spectacles frame 310, two optomechanical modules 400, two lenses 500, and a circuit board module 600. The two lenses 500 are fixed to the spectacles frame 310, respectively. The two optomechanical modules 400 are respectively loaded on the spectacles frame 310, respectively jointed to the two lenses 500, and configured for outputting signals (e.g., optical signals and/or electrical signals) to the lenses 500. The circuit board module 600 is disposed on the upper edge of the spectacles frame 310 and electrically connected to the optomechanical module 400.

Therefore, in accordance with the architecture described in the above embodiments, the circuit board module 600 of the head mounted display device 10 can be fully integrated into the spectacles frame 310 without being placed in the temple 200, so that the head mounted display device 10 can achieve a breakthrough in the purpose of downsizing.

More specifically, the spectacles frame 310 includes an elongated frame 311, two connection portions 314, two receiving grooves 320, two positioning grooves 330, and a nose-placing portion 340. The two connection portions 314 are respectively located at the opposite ends of the elongated frame 311, and are respectively pivotally connected to the temples 200. The elongated frame 311 has a first side and a second side 313. The first side includes a first left side 312a and a first right side 312b. The receiving grooves 320 are respectively located in the spaces surrounded by the first side and the second side 313 of the elongated frame 311, and configured for respectively placing the two lenses 500. Specifically, one lens 500 is placed in the space surrounded by the first left side 312a and the second side 313, and the other lens 500 is placed in the space surrounded by the first right side 312b and the second side 313.

The nose-placing portion 340 is located on the elongated frame 311 and interposed between the receiving grooves 320, and configured for aligning the nose bridge of a user. The circuit board module 600 is fixed to the second side 313 of the elongated frame 311. Each of the positioning grooves 330 is recessed on the elongated frame 311 and located between the connection portion 314 and the receiving groove 320, and configured for placing the optomechanical module 400. Therefore, when a user wears the aforementioned head mounted display device 10, the nose bridge of the user is aligned with the nose-placing portion 340 of the spectacles frame 310, so that the lenses 500 enables the eyes of the user face them squarely and provide images from the optomachnical module 400 to the eyes of the user. In a specific embodiment, the second side 313 of the elongated frame 311 is the upper edge of the elongated frame 311.

In the present embodiment, the circuit board module 600 is located at the top of the spectacles frame 310. More specifically, the elongated frame 311 includes a plurality of separation bars 350. The separation bars 350 are protruded from the second side 313 of the elongated frame 311, and the circuit board module 600 is locked to the separation bars 350 via bolts B.

In the present embodiment, the circuit board module 600 includes a main board 610, a processing unit 620, and a memory unit 630. The main board 610 is locked to the aforementioned separation bars 350 and crosses the nose-placing portion 340. The processing unit 620 is located on the main board 610 and electrically connected to the optomechanical module 400. The memory unit 630 is located on the main board 610 and is electrically connected to the processing unit 620. In addition, the circuit board module 600 further includes two first flexible circuit boards 910. The first flexible circuit boards 910 are respectively located on the elongated frame 311 and are flexingly and electrically connected to the circuit board module 600 and the optomechanical modules 400.

In the present embodiment, the main board 610 is, for example, a printed circuit board, a flexible circuit board, a flat cable, or the like. The processing unit 620 is, for example, a central processing unit (CPU), a graphics processing unit (GPU), or the chip hardware with both. However, the present disclosure is not limited thereto. The memory unit 630 is, for example, a dynamic random access memory (DRAM), a flash memory, or a hard disk (HDD). However, the present disclosure is not limited thereto.

However, the present disclosure is not limited thereto. In other embodiments, as long as the circuit board module 600 is located on the spectacles frame 310 and is located between the temples 200. For example, the circuit board module 600 can also be located on the bottom of the spectacles frame 310, with the spectacles frame 310 facing the inside of the user's face or facing away from the outside of the user's face. The circuit board module 600 can also be located on the upper edge of the spectacles frame 310. In a specific iembodiment, when the circuit board module 600 is disposed on the second side and the case module 100 encloses the window assembly 300 or the circuit board module 600, the top of the case module 100 is exactly flush with the top of the spectacles frame 310 (refer to FIG. 1).

As shown in FIG. 2 and FIG. 3, in the present embodiment, but not limited thereto, the aforementioned head mounted display device 10 further includes a photographing device 700. The photographing device 700 is disposed on the spectacles frame 310. The nose-placing portion 340 is provided with a recess 341. The recess 341 is located on the second side 313 of the elongated frame 311. The photographing device 700 is placed in the recess 341 and electrically connected to the circuit board module 600. More specifically, the circuit board module 600 further includes a second flexible circuit board 920. The photographing device 700 is flexingly and electrically connected to the circuit board module 600 through the second flexible circuit board 920.

Furthermore, as shown in FIG. 1, in the present embodiment, but not limited thereto, the head mounted display device 10 further includes a battery unit 800. The battery unit 800 is located in the temple 200, and electrically connected to the circuit board module 600 and/or the optomechanical module 400. More specifically, the battery unit 800 is electrically connected to the circuit board module 600 through the flexible circuit board (not shown in the figure). However, the present disclosure is not limited thereto. In other embodiments, the battery unit 800 may also be directly located on the spectacles frame 310 or in the case module 100.

Although the head mounted display device 10 in each of the above embodiments is a binocular display device, however, the present disclosure is not limited thereto. In other embodiments, the disclosure may also be changed to be a monocular display device with single optomechanical module.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A head mounted display device, comprising:
    a spectacles frame comprising an elongated frame having a first side, a second side and a plurality of separation bar protruded from the second side of the elongated frame, two connection portions respectively located at two opposite ends of the elongated frame, two receiving grooves respectively disposed between the first side and the second side of the elongated frame, and a nose-placing portion located on the elongated frame and interposed between the receiving grooves, and configured for aligning a nose bridge of a user;
    two temples connected to the opposite ends of the spectacles frame, respectively, and pivotally connected by the connection portions, respectively;
    two lenses fixed to the spectacles frame, wherein the receiving grooves are configured for respectively placing the two lenses fixedly; and
    at least one optomechanical module loaded on the spectacles frame, jointed with one of the two lenses, and configured for outputting a signal to the one of the two lenses; and
    a circuit board module disposed on the spectacles frame and electrically connected to the optomechanical module, and fixed to the second side of the elongated frame, and locked to the separation bars via a plurality of bolts, respectively.

2. The head mounted display device of claim 1, wherein the circuit board module comprises:
    a main board fixed to the second side of the elongated frame and crossing the nose-placing portion;
    a processing unit located on the main board and electrically connected to the optomechanical module; and
    a memory unit located on the main board and electrically connected to the processing unit.

3. The head mounted display device of claim 1, further comprising:
    a photographying device disposed on the spectacles frame, wherein the nose-placing portion is provided with a recess, the recess is located on the second side of the elongated frame, and the photographying device is placed in the recess and electrically connected to the circuit board module.

4. The head mounted display device of claim 1, wherein the circuit board module further comprises a flexible circuit board, the flexible circuit board is flexingly located on the elongated frame, and electrically connected to the circuit board module and the optomechanical module.

5. The head mounted display device of claim 1, further comprising:
    a battery unit electrically connected to the circuit board module and the optomechanical module, and located on the spectacles frame or one of the temples.

6. The head mounted display device of claim 1, wherein the circuit board module is located on the top or bottom of the spectacles frame.

7. The head mounted display device of claim 1, wherein the circuit board module is located inside or outside the spectacles frame.

8. The head mounted display device of claim 1, further comprising a case module, the case module enclosing the circuit board module, and the top of the case module being exactly flush with the top of the spectacles frame.

9. A head mounted display device, comprising:
    a spectacles frame;
    two temples connected to the opposite ends of the spectacles frame, respectively;
    at least one lens fixed to the spectacles frame;
    at least one optomechanical module loaded on the spectacles frame, jointed with the lens, and configured for outputting a signal to the lens;
    a circuit board module disposed on the spectacles frame and electrically connected to the optomechanical module; and
    wherein the circuit board module is located on the top or bottom of the spectacles frame.

10. The head mounted display device of claim 9, wherein the number of the at least one lens is two, and
    the spectacles frame comprises:
    an elongated frame having a first side and a second side, wherein the circuit board module is fixed to the second side of the elongated frame;
    two connection portions respectively located at the opposite ends of the elongated frame, and respectively pivotally connected to the temples;
    two receiving grooves respectively disposed between the first side and the second side of the elongated frame, and configured for respectively placing the lenses fixedly; and
    a nose-placing portion located on the elongated frame and interposed between the receiving grooves, and configured for aligning a nose bridge of a user.

11. The head mounted display device of claim 10, wherein the circuit board module comprises:
    a main board fixed to the second side of the elongated frame and crossing the nose-placing portion;
    a processing unit located on the main board and electrically connected to the optomechanical module; and
    a memory unit located on the main board and electrically connected to the processing unit.

12. The head mounted display device of claim 10, further comprising:
    a photographying device disposed on the spectacles frame, wherein the nose-placing portion is provided with a recess, the recess is located on the second side of the elongated frame, and the photographying device is placed in the recess and electrically connected to the circuit board module.

13. The head mounted display device of claim 9, further comprising:
a battery unit electrically connected to the circuit board module and the optomechanical module, and located on the spectacles frame or one of the temples.

14. A head mounted display device, comprising:
a spectacles frame;
two temples connected to the opposite ends of the spectacles frame, respectively;
at least one lens fixed to the spectacles frame;
at least one optomechanical module loaded on the spectacles frame, jointed with the lens, and configured for outputting a signal to the lens;
a circuit board module disposed on the spectacles frame and electrically connected to the optomechanical module; and
a case module, the case module enclosing the circuit board module, and the top of the case module being exactly flush with the top of the spectacles frame.

15. The head mounted display device of claim 14, wherein the number of the at least one lens is two, and
the spectacles frame comprises:
an elongated frame having a first side and a second side, wherein the circuit board module is fixed to the second side of the elongated frame;
two connection portions respectively located at the opposite ends of the elongated frame, and respectively pivotally connected to the temples;
two receiving grooves respectively disposed between the first side and the second side of the elongated frame, and configured for respectively placing the lenses fixedly; and
a nose-placing portion located on the elongated frame and interposed between the receiving grooves, and configured for aligning a nose bridge of a user.

16. The head mounted display device of claim 15, wherein the circuit board module comprises:
a main board fixed to the second side of the elongated frame and crossing the nose-placing portion;
a processing unit located on the main board and electrically connected to the optomechanical module; and
a memory unit located on the main board and electrically connected to the processing unit.

17. The head mounted display device of claim 15, further comprising:
a photographying device disposed on the spectacles frame,
wherein the nose-placing portion is provided with a recess, the recess is located on the second side of the elongated frame, and the photographying device is placed in the recess and electrically connected to the circuit board module.

18. The head mounted display device of claim 14, further comprising:
a battery unit electrically connected to the circuit board module and the optomechanical module, and located on the spectacles frame or one of the temples.

* * * * *